(No Model.)
F. M. SHERMAN.
Pump Plunger.
No. 238,614. Patented March 8, 1881.
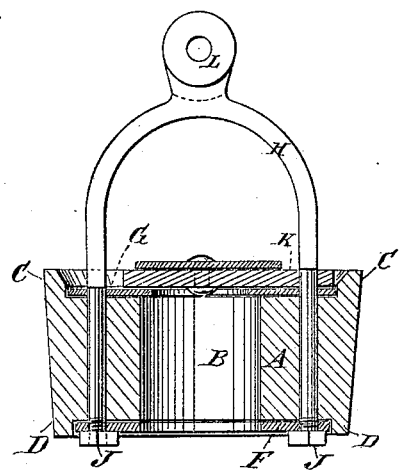
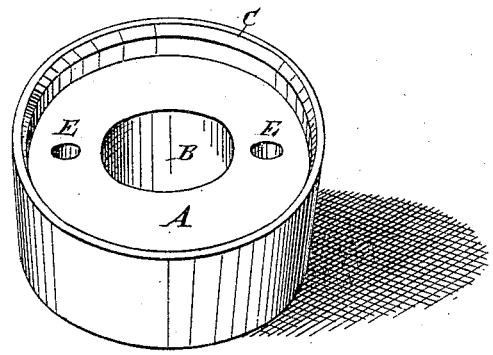
WITNESSES:
Chas Nida
C. Sedgwick
INVENTOR:
F. M. Sherman
BY Munn & Co
ATTORNEYS.

UNITED STATES PATENT OFFICE.

FREDERIC M. SHERMAN, OF NEW LONDON, CONNECTICUT.

PUM P-PLUNGER.

SPECIFICATION forming part of Letters Patent No. 238,614, dated March 8, 1881.

Application filed October 18, 1880. (No model.)

*To all whom it may concern:*

Be it known that I, FREDERIC M. SHERMAN, of New London, New London county, and State of Connecticut, have invented a new and Improved Plunger for Pumps, of which the following is a specification.

The object of my invention is to provide an elastic plunger for pumps, which will always closely fit the barrel of the pump and do away with the necessity of having a separate packing in the plunger.

The invention consists in a plunger for pumps made of a solid block of rubber, in form of an inverted frustum of a cone, with a central aperture provided with a pivoted or ball valve, to which plunger a rod-stirrup is fastened by means of washer-plates which fit into recesses in the top and bottom of the plunger, and with suitable nuts, which washer-plates serve to hold the rubber in proper shape, said nuts being also used to compress the rubber, when desired.

In the accompanying drawings, Figure 1 is a cross-sectional elevation of my improved plunger, showing the manner in which the stirrup is fastened thereto; and Fig. 2 is a perspective view of my improved solid rubber plunger without the stirrup and stiffening-plates.

Similar letters of reference indicate corresponding parts.

The plunger A is made of solid vulcanized rubber, or compounds thereof, with a central aperture, B, giving the plunger the shape of a ring. The periphery of said ring, at the top or upper side, is made larger than at the bottom, for the purpose of avoiding unnecessary friction. The top and bottom of this ring are slightly recessed, so as to form the annular flanges C D at the outer edges of the top and bottom, respectively, whereby the rubber may be more easily expanded, by means of plates and nuts yet to be described, for the purpose of causing the plunger to fit the bore of any pump, and especially pumps that have become very much chamber-worn. The plunger is also provided with two smaller perforations, E E, at the side of the main central aperture, B. A plate, F, of metal or other stiff material, is placed in the recess on the under side of the plunger, and a like plate, G, is placed in the recess in the upper side of the plunger, upon which the prongs of the stirrup H are passed through these plates and the perforations E E, and are secured by the nuts J J, screwed upon the lower ends of these shanks. One of the shanks of the stirrup H also passes through the fixed end of the rubber or leather valve-plate K, if a swinging or hinged valve, as shown, is to be used. The stirrup H is provided with an eye, L, at its upper end.

As the body of the plunger is made entirely of rubber, no packing strips or rings are required, and the plunger will also fit closely to all the irregularities of the barrel. If the plunger is worn off, the nuts J J are drawn up tight, thereby compressing the rubber so that the sides bulge out and fit closely into the barrel.

I do not broadly claim a conical rubber piston clamped between two apertured metal plates, such as is shown in the Merrill and Lawrence Patent No. 67,666, dated August 13, 1867; but

What I claim as my invention, and desire to secure by Letters Patent, is—

The conical rubber plunger A, having central aperture, B, and annular flanges C and D at the top and bottom, in combination with the plates F and G, each having a central aperture, substantially as shown and described, and for the purpose specified.

FREDERIC M. SHERMAN.

Witnesses:
ETHEN W. REYNOLDS,
PARDON M. ALEXANDER.